July 29, 1958
F. E. SMITH
2,845,169
VIBRATORY CONVEYOR
Filed Dec. 16, 1954
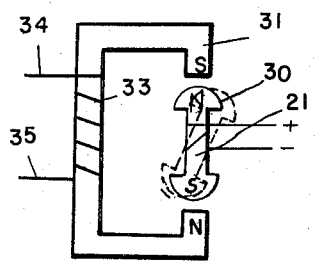
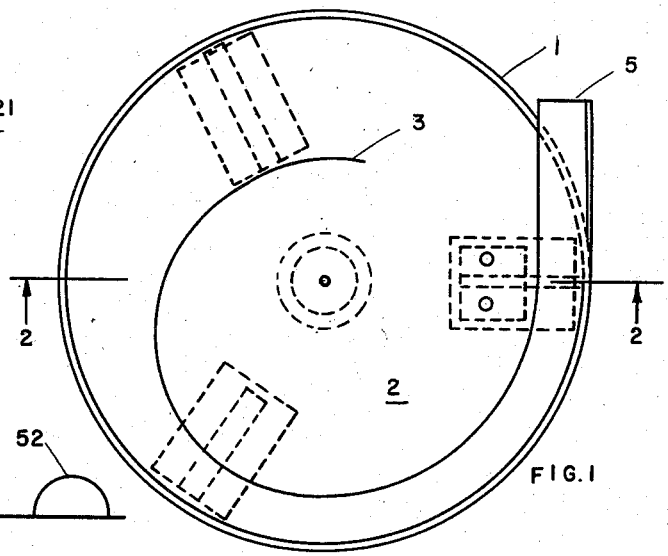
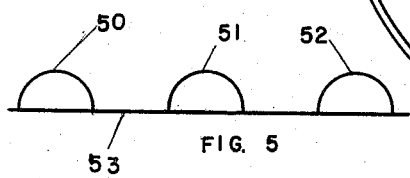
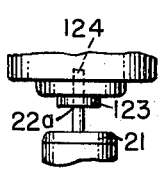
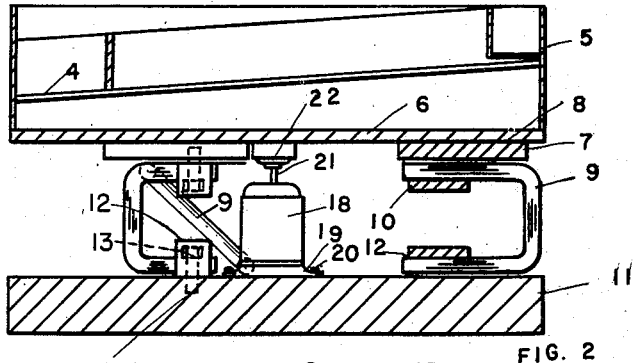
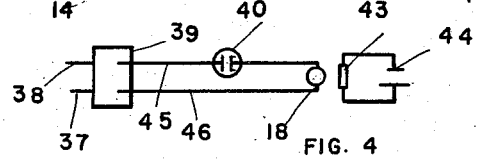
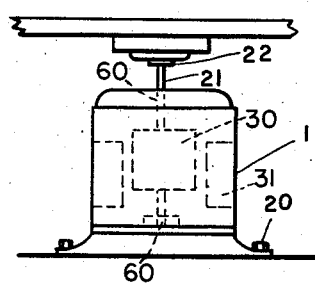
Inventor
FLOYD EDWARD SMITH
By Charles L. Lovercheck
Attorney

United States Patent Office 2,845,169
Patented July 29, 1958

2,845,169

VIBRATORY CONVEYOR

Floyd Edward Smith, Erie, Pa.

Application December 16, 1954, Serial No. 475,807

6 Claims. (Cl. 198—220)

This invention relates to conveyors and especially to the type of conveyors used for dressing and aligning articles of manufacture.

This application is a continuation in part of application, Serial No. 371,983, filed August 3, 1953.

The said application discloses an especial spring for mounting a vibratory conveyor or parts feeder. The present application discloses an improved electrical means for imparting vibration to the hopper of a parts feeder. In the prior application, a solenoid was disclosed which applied an axial force to the hopper. The present application utilizes a motor of a type to impart a torsional force to the hopper. By using a torsional force instead of an axial force, it is possible to adjust the springs to a more nearly vertical position. The torsional power is more directly applied, the apparatus is self-compensating; that is, the springs do not need to be tuned to their natural frequency, and, further, since the motor can be sealed, the entire device is able to meet safety precautions in hazardous atmospheres and will be approved by National Underwriters Association. The present system lends itself to more ready installation.

More specifically, it is an object of this invention to provide a power mechanism for supplying power to a conveyor or parts feeder which is simple in construction, economical to manufacture, and simple and efficient to use.

Another object of the invention is to provide a power device for a vibratory conveyor which is self-compensating and which uses a more direct application of power thereto.

Another object of this invention is to provide a torsional power source for a vibratory conveyor.

A further object of the invention is to provide a power means for a vibratory conveyor which applies both a torsional and an axial force to the conveyor.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1 is a top view of a vibratory conveyor according to the invention;

Fig. 2 is a cross sectional view taken on line 2—2 of Fig. 1;

Fig. 3 is an enlarged view of the motor used for vibrating the feeder;

Fig. 4 shows a rectifier circuit for use in operating the motor;

Fig. 5 is a diagram of the half waves which result from the circuit shown in Fig. 4 and which are applied to the motor;

Fig. 6 is a schematic view of a motor for use in the conveyor shown in Figs. 1 and 2 showing an alternating current source or power applied to the motor; and Fig. 7 is a view of a motor shaft connection.

Now with more specific reference to the drawing, a vibratory conveyor 1 is shown having a hopper 2 provided with a helical track 3 having a bottom 4 and adapted to discharge parts at 5 as they are moved up the helical track 3 and are dressed as they pass therearound. The operation of this feeder has been explained in the parent application and will not be reiterated at this point. The conveyor 1 has a bottom 6 which is attached to a plate 7 at 8 and has the U-shaped springs 9 clamped thereto by means of clamping members 10; however, the springs 9 could be made of leaf springs as shown in previous disclosures, for example, British Patent 279,119 of 1927 or the hopper 2 could be supported on helical springs, on air, or on any other resilient means. The springs 9 are clamped to the base 11 by means of clamping members 12 secured by bolts 13 threadably inserted in the base 11 in holes 14. The springs 9 may be made in a U-shaped form and when an axial or torsional force is applied to the hopper 2, both a bending and a torsional force will result in the springs 9.

Torsional vibration is applied to the hopper 2 by means of motor 18 having its rotor mounted off magnetic center as shown in Fig. 3 which is clamped to the base 11 at 19 by means of bolts 20 which are attached to the base 11 and extend upwardly therefrom and are clamped to the hopper 2 at 22. If, as in certain applications, it is found expedient to apply only a torsional force to the conveyor 1, shaft 21 may be connected to the conveyor 1 by means of a sliding keyed joint or a similar connection such as a spline bearing 123 in Fig. 7 whereon a splined shaft 22a makes slidable connection therewith but is restrained against rotation relative thereto. If it is desired to apply both an axial and a torsional force to the hopper, the rotor 30 will be offset from alignment with the stator 31 as shown in Fig. 3; that is, the rotor 30 will be set off magnetic center. Ends 124 of the shaft of the rotor 30 will slide in the bearings 60. The motor 18 is shown in an enlarged view at Fig. 3 and the inside of the motor 18 may be constructed as shown schematically in Fig. 6 having a rotor 30 which has the shaft 21 fixed thereto and pivoted in the frame of the motor 18 on the stator 31. The stator 31 has a winding 33 thereon which terminates in terminals 34 and 35 which are adapted to be attached to an A. C. line or they may be supplied with D. C. current from a circuit as shown in Fig. 6. If it is desired to operate the motor 18 on D. C., a circuit similar to that shown in Fig. 4 will be used wherein the A. C. lines 37 and 38 are connected to the transformer 39 which sends power to the rectifier 40 which could be any suitable type of rectifier. Half waves are transmitted to the motor 18 from transformer 39 and rectifier 40. The field 43 of the motor 18 is shown with direct current applied thereto from a source indicated by the battery 44. It could be taken from the wires 45 and 46 as intermittent D. C. The rotor 30 could also be a permanent magnet made of some well known material.

It will be noted that when D. C. having the approximate wave form shown in Fig. 5 as 50, 51, and 52 is applied to the motor 18, it will tend to rotate in one direction, rotating the hopper 2 in, for instance, a clockwise direction to force the springs 9 downward and to rotate the hopper 2. When the power is intermittently cut off between the pulses 50 and 51 and 51 and 52, the springs 9 will tend to restore the hopper 2 to its original position. Then on the next pulse 51, the motor 18 will twist the hopper 2 and pull it downward into registration with the stator. In practice, the rotor 30 of the motor 18 may be set above a magnetic center so that when power is applied to the motor 18, the rotor 30 will pull downward as well as apply torsional force to the hopper 2. Then, on the cut-off period, it will be pulled off electrical center by springs 9. Thus, intermittent axial and torsional force will result.

When alternating current is used on the stator 31 of the motor 18, the motor 18 will rotate in a counterclockwise direction and the rotor 30, being at off-magnetic center; that is, moved laterally in its gaps between its coils, will exert a downward force. Then, on the next half cycle, the polarity of the stator 31 will reverse so that the stator poles will repel the rotor poles and the rotor 30 will be urged out of the magnetic center; that is, upward, and a torsional force will be applied in the opposite direction.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A vibratory conveyor comprising a support, a conveyor adapted to convey articles disposed adjacent said support, resilient means to support said conveyor on said support and to guide said conveyor in a helical path, and means to apply an intermittent torsional force to said conveyor whereby said conveyor is moved intermittently in a helical path guided by said guide means and articles carried by said conveyor are moved in a helical path, said means to apply force comprising a motor having its shaft disposed axially of said conveyor and having a rotor attached to said shaft and said conveyor and a stator attached to said support.

2. The conveyor recited in claim 1 wherein the rotor of said motor is disposed off magnetic center when said conveyor is in relaxed position whereby an axial force is applied to said conveyor when power is applied to said motor.

3. A conveyor comprising a hopper having a helical track therein, said hopper being supported on circumferentially spaced bar type springs disposed at an acute angle to a support and inclined in the same direction, a motor having one part thereof attached to a support and a part relatively rotatable with regard thereto attached to said hopper, and means to apply intermittent power to said motor whereby torsional forces between said motor parts are applied.

4. The conveyor recited in claim 3 wherein said parts of said motor comprise a stator and a rotor and said means to apply power applies alternating current to one of said rotor and stator of said motor and direct current to the other part.

5. The conveyor recited in claim 3 wherein said parts of said motor comprise a stator and a rotor and said means applies alternating current to one of said rotor and stator of the motor and the other of said rotor and stator is made of a permanent magnet.

6. A vibratory conveyor comprising a hopper, a helical track in said hopper, said hopper mounted on resilient means whereby said hopper is restrained to move in a helical path, a motor attached to a support, said motor having a shaft slidably attached to said hopper and restrained against rotation relative to said hopper, and means to apply intermittent electrical power to said motor whereby said conveyor is vibrated in a helical path.

References Cited in the file of this patent

UNITED STATES PATENTS

| | | |
|---|---|---|
| 2,637,437 | Jacobsen | May 5, 1953 |
| 2,662,192 | Weyandt | Dec. 8, 1953 |